(12) United States Patent
Noethlings et al.

(10) Patent No.: US 11,029,161 B2
(45) Date of Patent: Jun. 8, 2021

(54) POSITION DETERMINATION DEVICE AND METHOD

(71) Applicant: SONY CORPORATION, Tokyo (JP)

(72) Inventors: Rolf Noethlings, Stuttgart (DE); Ben Eitel, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 441 days.

(21) Appl. No.: 15/758,637

(22) PCT Filed: Sep. 16, 2016

(86) PCT No.: PCT/EP2016/072017
§ 371 (c)(1),
(2) Date: Mar. 8, 2018

(87) PCT Pub. No.: WO2017/046353
PCT Pub. Date: Mar. 23, 2017

(65) Prior Publication Data
US 2018/0274931 A1    Sep. 27, 2018

(30) Foreign Application Priority Data
Sep. 16, 2015  (EP) .................................... 15185520

(51) Int. Cl.
*G01C 21/20*       (2006.01)
*G01C 21/08*       (2006.01)
(52) U.S. Cl.
CPC ........... *G01C 21/206* (2013.01); *G01C 21/08* (2013.01)
(58) Field of Classification Search
CPC .............................. G01C 21/206; G01C 21/08
See application file for complete search history.

(56) References Cited

U.S. PATENT DOCUMENTS 9,154,914 B2    10/2015    Haverinen
9,253,601 B2    2/2016     Haverinen
(Continued)

FOREIGN PATENT DOCUMENTS

EP    2 615 419 A2    7/2013
FI    20125483       11/2013

OTHER PUBLICATIONS

International Search Report dated Dec. 5, 2016, in PCT/EP2016/072017 filed Sep. 16, 2016.
(Continued)

*Primary Examiner* — Hunter B Lonsberry
*Assistant Examiner* — Matthew J. Reda
(74) *Attorney, Agent, or Firm* — Xsensus LLP (57) ABSTRACT

A position determination device, for example for indoor positioning, includes data input circuitry configured to obtain at least one magnetic field vector sensed by a magnetic sensor, data processor circuitry configured to determine the magnetic magnitude and a further magnetic parameter of the at least one obtained magnetic field vector, comparison circuitry configured to compare the determined magnetic magnitude with a predetermined magnetic magnitude map of a region around the magnetic sensor to obtain a first estimate of the sensor position and to compare the determined further magnetic parameter with a corresponding predetermined further parameter map of a region around the magnetic sensor to obtain a second estimate of the sensor position, and position determination circuitry configured to weight the first and second estimates of the sensor position according to determined weight information and to determine the sensor position from the weighted first and second estimates.

19 Claims, 5 Drawing Sheets

(56) References Cited

U.S. PATENT DOCUMENTS

| | | |
|---|---|---|
| 9,544,730 B2 | 1/2017 | Haverinen |
| 9,551,561 B2 * | 9/2017 | Kochanski ............. G01B 7/004 |
| 2012/0143495 A1 | 6/2012 | Dantu |
| 2013/0177208 A1 | 7/2013 | Haverinen |
| 2013/0179074 A1 | 7/2013 | Haverinen |
| 2013/0179075 A1 | 7/2013 | Haverinen |
| 2013/0310069 A1 | 11/2013 | Haverinen |
| 2014/0286534 A1 | 9/2014 | Haverinen |
| 2014/0320121 A1 * | 10/2014 | Perttunen ............. G06Q 20/102 |
| | | 324/244 |
| 2014/0357305 A1 | 12/2014 | Haverinen et al. |
| 2015/0106373 A1 | 4/2015 | Haverinen et al. |
| 2015/0153151 A1 * | 6/2015 | Kochanski ............. G01B 7/004 |
| | | 702/150 |
| 2015/0260523 A1 | 9/2015 | Haverinen |
| 2015/0260524 A1 | 9/2015 | Haverinen |
| 2016/0202064 A1 | 7/2016 | Haverinen |
| 2017/0265041 A1 * | 9/2017 | Mahasenan ........... H04W 64/00 |

OTHER PUBLICATIONS

Jaewoo Chung et al., "Indoor Location Sensing Using Geo-Magnetism", MobiSys' 11, (2011), pp. 141-154.
Dries Vandermeulen et al., "Indoor Localization using a Magnetic Flux Density Map of a Building". AMBIENT 2013: The Third International Conference on Ambient Computing, Applications, Services and Technologies, (2013), pp. 42-49.
Thomson Reuters, "Dynamic Geomagnetic Fingerprint for Indoor Positioning" Patentability Search Report, Sony Ref: PSR-15-061, (2015), 30 pages.

* cited by examiner

POSITION DETERMINATION DEVICE AND METHOD

CROSS REFERENCE TO RELATED APPLICATIONS

The present application claims priority to European Application 15185520.2 filed on 16 Sep. 2015, the contents of which being incorporated herein by reference in its entirety.

BACKGROUND

Field of the Disclosure

The present disclosure relates to a position determination device and a corresponding position determination method for determining the position of the device, in particular indoors. The present disclosure relates further to a mobile device and a non-transitory computer-readable recording medium.

Description of Related Art

For indoor positioning (in particular localization and/or navigation) many technologies are being researched. The geomagnetic fingerprinting technology takes advantage of the fact that the magnetic field inside buildings is distorted by the building's construction (material) in a unique way. The idea is to collect magnetic maps of the building (offline phase), which can be used later for navigation (online phase), in a way, that current magnetic measurements are matched against the mapped magnetic profile (fingerprints). The more components a fingerprint contains, the more unique is its evaluation; on the other hand, the less components a fingerprint has, the more matches will be found in a fingerprint map. Of course, a magnetic map of a building will contain many duplicates or at least similar entries.

The earth magnetic field is a 3-dimensional vector (i.e. has x, y, z components), which principally allows generating 3-dimensional fingerprints. However, as the measurements depend on the sensor orientation of the magnetic sensor, which cannot, or only partly, be detected (e.g. by means of an acceleration sensor), only one magnetic component (e.g. magnitude) or two components (e.g. vertical and horizontal component) can generally be used as fingerprint.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

According to an aspect there is provided a position determination device comprising:
- a data input circuitry configured to obtain at least one magnetic field vector sensed by a magnetic sensor,
- a data processor circuitry configured to determine the magnetic magnitude and a further magnetic parameter of the at least one obtained magnetic field vector,
- a comparison circuitry configured to compare the determined magnetic magnitude with a predetermined magnetic magnitude map of a region around the magnetic sensor to obtain a first estimate of the sensor position and to compare the determined further magnetic parameter with a corresponding predetermined further parameter map of a region around the magnetic sensor to obtain a second estimate of the sensor position,
- a weight determination circuitry configured to determine weight information indicating the reliability of the first and/or second estimate of the sensor position and/or the relative weight of the first estimate with respect to the second estimate, and
- a position determination circuitry configured to weight the first and second estimates of the sensor position according to the determined weight information and to determine the sensor position from the weighted first and second estimates.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
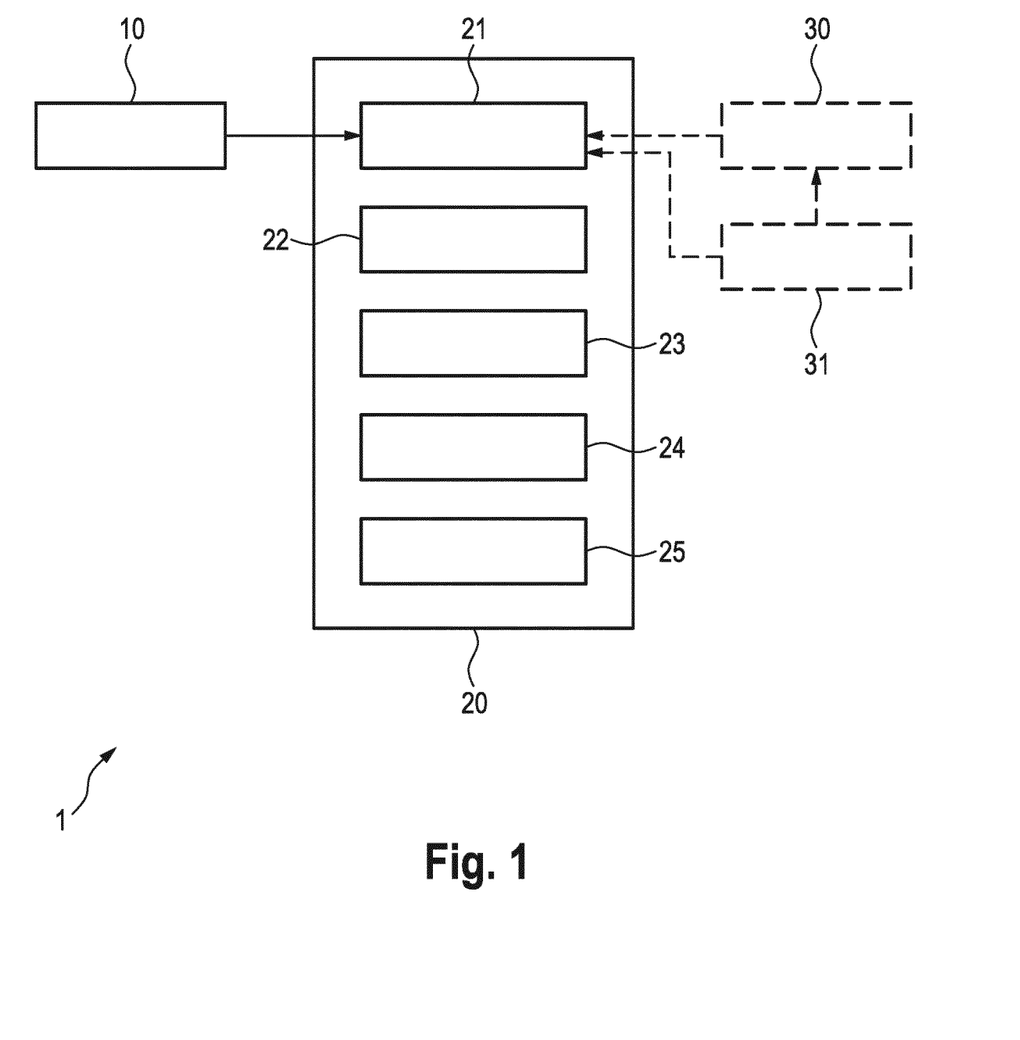
FIG. 1 shows a schematic diagram of a first embodiment of the mobile device including a position determination device according to the present disclosure.

Referring now to the drawings, wherein like reference numerals designate identical or corresponding parts throughout the several views, FIG. 1 shows a schematic diagram of a first embodiment of the mobile device 1, such as a smartphone or other wearable or handheld device. The mobile device 1 is particularly configured to determine its position, especially indoors at a certain premise, where a conventional navigation system such as the GPS system does not work at all or not work properly. Such a position determination may be useful or required e.g. for navigation in a shopping mall, a factory, a parking garage, a hospital, an office building, a train station, an airport, etc., generally in larger buildings for informing the user of the mobile device where he is and/or where to go and/or for informing other persons (such as a caregiver in a hospital or rest home) where the user of the mobile device (e.g. a patient or elder person) currently is.

The mobile device 1 includes a magnetic sensor 10 (also called magnetic position sensor or magnetometer) for sensing at least one magnetic field vector at the position of the mobile device 1. Such magnetic sensors are commonly known and used e.g. Hall or magneto-resistive technologies. Conventional smartphones include such a magnetic sensor to create a miniature Hall-effect sensor that detects the Earth's magnetic field along three perpendicular axes X, Y and Z. The Hall-effect sensor produces voltage which is proportional to the strength and polarity of the magnetic field along the axis each sensor is directed. Other technologies used for magnetic sensors may include magneto-resistive devices which change the measured resistance based on changes in the magnetic field.

The mobile device 1 further includes a position determination device 20 according to the present disclosure for determining the position of the mobile device 1 based on the at least one magnetic field vector sensed by the magnetic sensor 10. The position determination device 20 may be implemented in software, hardware or a mixture of soft- and hardware. For instance, a processor may be provided in the mobile device 1 implementing the functions of the position determination device 20. The processor may also be programmable so that the functions are realized by program code that is carried out by the processor to carry out said functions.

The position determination device 20 comprises a data input circuitry 21 configured to obtain at least one magnetic field vector sensed by a magnetic sensor 10, e.g. via a wired line, a bus line or a wireless line, depending on the implementation of the mobile device 1, between the magnetic sensor 10 and the data input 21, which may be a conventional data interface.

The position determination device 20 further comprises a data processor circuitry 22 that determines the magnetic magnitude and a further magnetic parameter of the at least one obtained magnetic field vector. Conventionally, a magnetic sensor 10 measures the magnetic field vector, e.g. the magnetic components in x-, y- and z-direction. These are converted into the magnetic magnitude, i.e. the absolute value of the magnetic field intensity, and a further magnetic parameter used for the position determination. This further parameter is preferably the magnetic inclination, which is the angle between the horizontal plane and the measured magnetic field vector. Other useful parameters may be the horizontal and/or vertical magnetic component of the magnetic field vector.

The position determination device 20 further comprises a comparison circuitry 23 that compares the determined magnetic magnitude with a predetermined magnetic magnitude map of a region around the magnetic sensor to obtain a first estimate of the sensor position and that compares the determined further magnetic parameter with a corresponding predetermined further parameter map of a region around the magnetic sensor to obtain a second estimate of the sensor position. These maps may either be stored in an (optional) storage circuitry 30 (e.g. a semiconductor memory) or may be accessed on the fly, e.g. provided in the cloud, the internet or a server provided for wireless access by an optional access circuitry 31 (e.g. a WiFi interface, mobile communications interface, etc.) of the mobile device. For instance, these maps may be available for free download or access, e.g. via WiFi, when the building (e.g. a shopping mall) is entered so that navigation throughout the building can be guaranteed, e.g. to the customers and suppliers of the shopping mall. Alternatively, these maps may be pre-stored on the mobile device 1.

The magnitude map indicates the magnetic magnitude of the magnetic field vector at the premise, e.g. the shopping mall, which represents the Earth's magnetic filed distorted by the building and elements (walls, infrastructure, etc.) in the building. The further parameter map indicates the further magnetic parameter (e.g. the magnetic inclination) of the magnetic field vector at the premise.

These maps may be acquired in advance, e.g. by the owner or operator of the premise (e.g. the shopping mall) so that they can be obtained as input by the mobile device via the data input circuitry 21. Generally, such a magnetic magnitude map and a further parameter map are not available, but only a horizontal magnetic component map and a vertical magnetic component map are available. Hence, in this case, these available maps are obtained by the data input circuitry 21 and the data processor circuitry 22 determines said magnetic magnitude map and/or said further parameter map of the region around the magnetic sensor 10 from the obtained horizontal magnetic component map and vertical magnetic component map.

Generally, the required maps are obtained by the position determination device 20 for a region around the magnetic sensor 10. The region may depend on the size of the premise, the volume of the maps, the desired application, the desired accuracy and/or reliability, etc. The region may be the complete premise, e.g. a complete building such as a complete shopping mall, but may also be a map of only a portion thereof, such as the map of a particular wing of the building or of the floor where the mobile device currently is (as e.g. be known from a prior position determination, for instance based on GPS before the user entered the building or based on the herein disclosed method, or based on a beacon signal telling the mobile device where it is). The region should be large enough to allow the desired position detection and optionally navigation with the desired accuracy and reliability.

The range may depend on a number of factors and may be adjusted dynamically. Such factors may include: update rate of the positioning system (e.g. every second or every half of a second), speed of the user, uncertainty derived from the positioning algorithm, local variation of the map (a homogenous part requires a larger range, which a heterogeneous part enables a smaller or medium sized range), etc. The region may e.g. encompass the whole floor or building if no initial position is given or the position estimate becomes very uncertain. In case of position convergence the region is typically in the order of a few meters (e.g. of a 5 to 10 m radius).

These maps can thus be used to compare the measured magnetic magnitude and the further magnetic parameter measured at a particular location with the maps to obtain two separate estimates of the location where the measurement values have been acquired. These estimates may be lists of potential locations, optionally with a certain likelihood, or may be deviation maps. For instance, in an embodiment the comparison circuitry 23 obtains a first deviation distribution as first estimate, the first deviation distribution indicating the deviation of the determined magnetic magnitude from the magnitude map, and a second deviation distribution as second estimate, the second deviation distribution indicating the deviation of the determined further magnetic parameter from the further parameter map.

The position determination device 20 further comprises a weight determination circuitry 24 that determines weight information indicating the reliability of the first and/or second estimate of the sensor position and/or the relative weight of the first estimate with respect to the second estimate. It has been found that in certain situations the magnetic magnitude is more reliable and should be weighted stronger, whereas in other situations the further magnetic parameter is more reliable and should be weighted stronger. For instance, if a user of the mobile device is walking, the magnetic magnitude measurement is not much affected, whereas the further magnetic parameter may be strongly affected, in which case the first estimate should be weighted stronger than the second estimate in the subsequent processing of the weighted estimates.

Finally, the position determination device 20 further comprises a position determination circuitry 25 that weights the first and second estimates of the sensor position according to the determined weight information and determines the sensor position from the weighted first and second estimates. For instance, in an embodiment the position determination circuitry 25 is configured to determine a first position likelihood distribution from the first estimate and the weighting information, to determine a second position likelihood distribution from the second estimate and the weighting information, and to determine the sensor position by combining the first and second position likelihood distributions. Different algorithms exist to obtain the position estimate from such likelihood distributions (MMSE, ML, etc.).

In principle it is better to have/use more dimensions to match fingerprints, as it will result in more unique results and less duplicates. This presumes that the fingerprint components are available and reliable. Magnetic field is a 3-dimensional vector (x, y, z) which theoretically provides a 3-dimensional magnetic fingerprint. Generally, the measurements depend on the orientation of the sensor. Utilizing an accelerometer (which is also typically available in a smartphone), the magnetic x,y,z-components can be decomposed into a vertical component (direction of gravity) and a horizontal component. In order to further differentiate according to "world coordinates", information about "true north" would be needed. This typically does not hold so that most realizations of the geomagnetic approach analyze horizontal and vertical components or the magnetic magnitude only.

It has been found that the transformation (x,y,z)->(horizontal, vertical) based on the accelerometer (gravity) sensor is unreliable especially when the sensor is in motion (e.g. a person walking with the smartphone), whereas the magnetic magnitude does not suffer. Thus, the present disclosure proposes to compose magnetic fingerprints of the magnetic magnitude and another magnetic parameter, particularly its complementary magnetic inclination. Further, the estimates obtained from said two parameters are weighted according to their reliability (or availability as a "boundary case"). As magnetic inclination is orthogonal to magnetic magnitude, its utilization is preferred.

Figure 2:
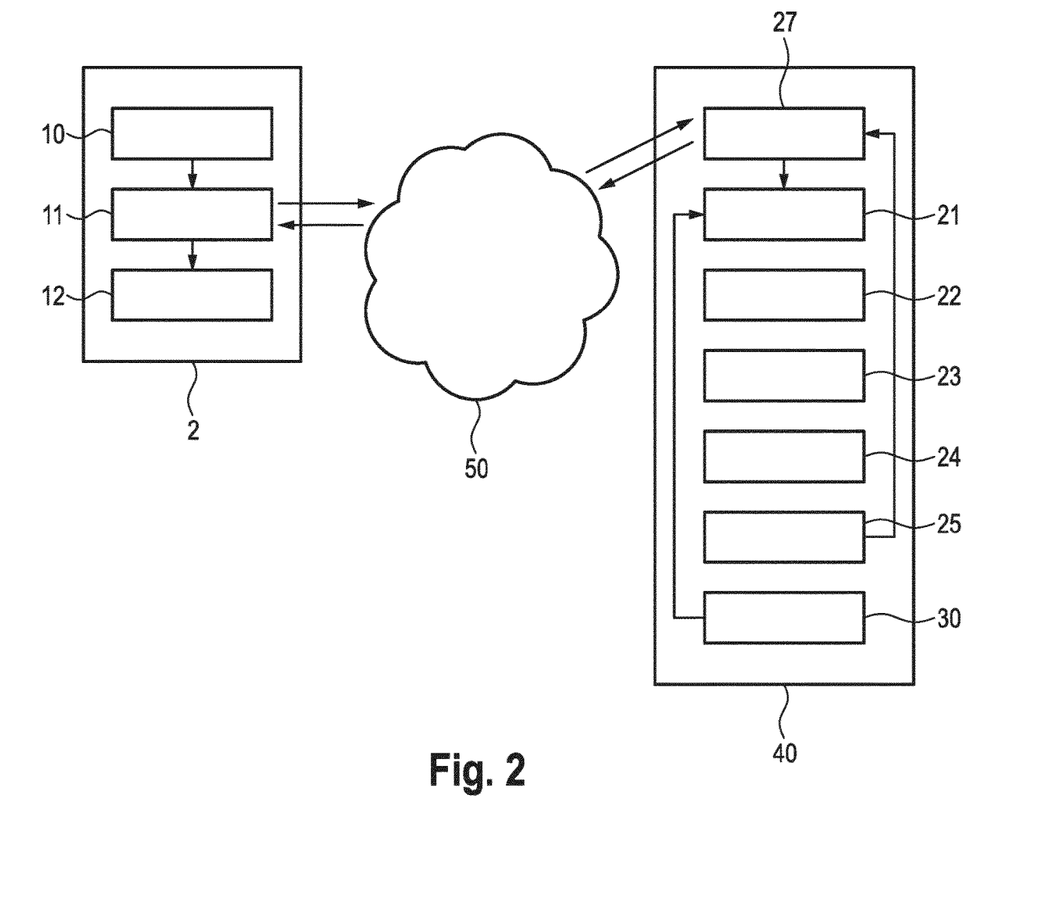
FIG. 2 shows a schematic diagram of a second embodiment of the mobile device and of the position determination device according to the present disclosure.

In the embodiment shown in FIG. 1 all elements of the mobile device 1 are integrated into a single device, which may e.g. be a handheld device, wearable device, mobile phone, smartphone, portable phone, camera, watch, vital signs monitor, laptop, tablet, or glasses. In another embodiment as illustrated in FIG. 2 the mobile device 2 and the position determination device 40 may be arranged at different locations and are not integrated into a single device.

For instance, the mobile device 2 may be a device carried by the user and includes the magnetic sensor 10, a wireless interface 11 and a user interface 12, but not the position determination device 40. The position determination device 40 may for instance be implemented in a central computer system, server or workstation, e.g. arranged somewhere at the premise and provided by the owner or operator of the premise or somewhere in the cloud or internet. The data measured by the magnetic sensor 10 are thus transmitted by the wireless interface 11 (e.g. a WiFi transceiver or another communications circuitry as e.g. used for mobile communications) through a network 50 (e.g. WiFi network, communications network, . . . ) to the position determination device 40, which itself may comprise, in addition to the elements shown in FIG. 1, a corresponding wireless interface 27 or receives the measured data from the central computer system that includes such a wireless interface. The determined position information is then transmitted back to the mobile device 2 through the wireless interface 11 so that it can be used by the mobile device 2 to indicate on the user interface 12 (e.g. a display) the current position and/or the way where the user should go to a desired destination.

This embodiment thus provides the advantage that the mobile device does not need to be configured to perform all the processing of the position determination device, i.e. can be configured much simpler with less hard- and software, and further does also not require to obtain and optionally store any maps as described above, which can also be done by the position determination device 40. The mobile device 2 can thus e.g. be a rather simple wrist worn device or camera.

Figure 3:
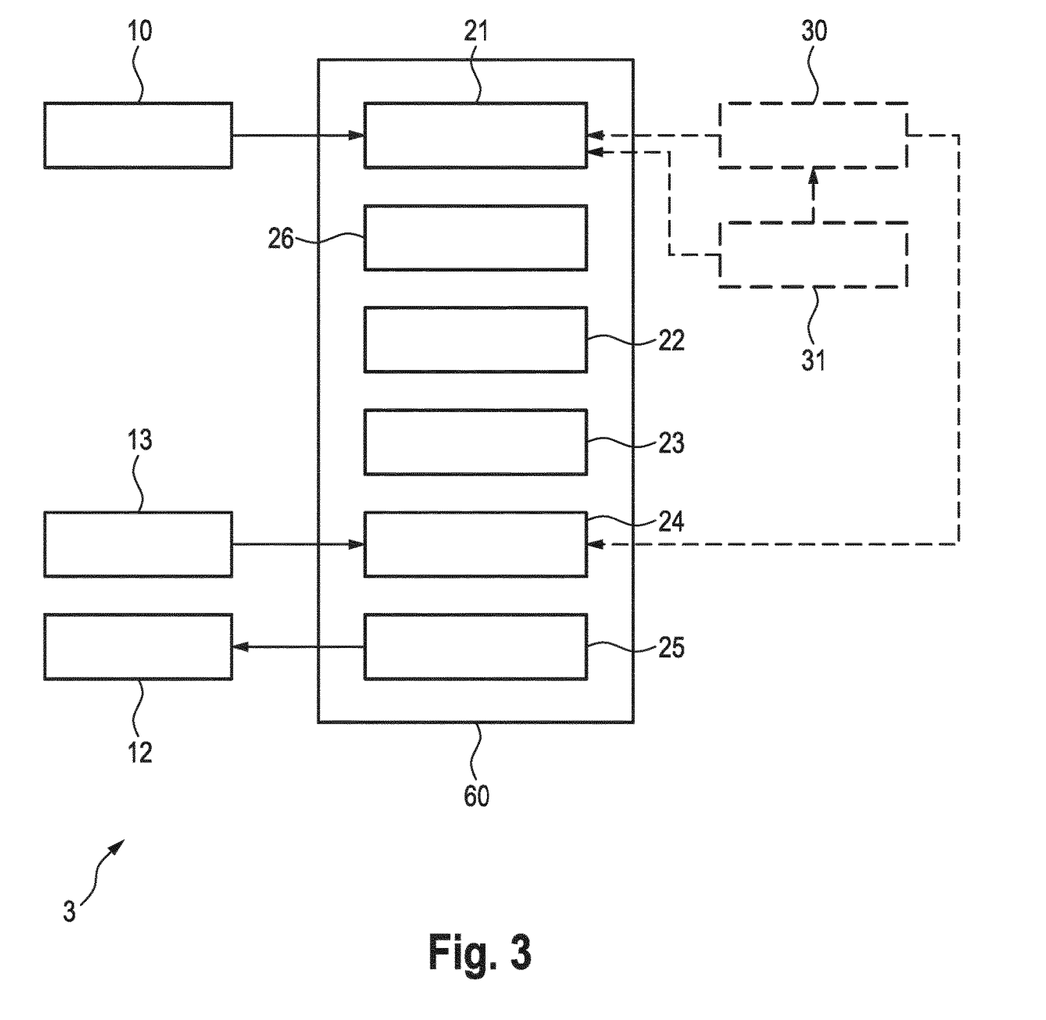
FIG. 3 shows a schematic diagram of a third embodiment of the mobile device including a position determination device according to the present disclosure.

A schematic diagram of a third embodiment of the mobile device 3 including a position determination device 60 according to the present disclosure is illustrated in FIG. 3. In this embodiment the mobile device 3 further comprises a motion detector 13, e.g. an accelerometer, for obtaining motion information indicating motion of the mobile device 3. Said motion information is used by the weight determination circuitry 24 to determine said weight information based on the motion information. This motion information may e.g. be motion of the user's body part carrying the mobile device 3 or the step pattern of the user.

In an embodiment, when it is detected that a user is standing, both magnetic parameters are preferably used (magnitude and the further parameter), e.g. both are weighted equally, as both are supposed to be reliable and more parameters generally provide better (more unique) matching results. When it is detected that a user is (fast) walking, only or mainly the robust (motion independent) magnetic magnitude is used for position determination, i.e. the first estimate is weighted with larger weight than the second estimate, which may even be weighted with the weight zero. If no motion detector (or gravimeter) is available (or their signals cannot be fused) only or mainly the magnetic magnitude is used in an embodiment.

The position determination circuitry 60 may further comprise a filter 26 for low-pass filtering the obtained at least one magnetic field vector, whereby at least two sequentially sampled magnetic field vectors are preferably used to apply the filter 26. In this case data processor circuitry 22 determines the magnetic magnitude and the further magnetic parameter from the at least one filtered magnetic field vector.

Further, in this embodiment local variation information of the magnetic parameters (magnetic magnitude, further magnetic parameter) may be used in the weighting process. The local variation information may be derived from the map data and thus can be pre-computed and stored together with the magnetic field data in the map for certain local sensor areas, e.g. in an area having a radius in a range between 1 m and 20 m, in particular in a range between 2 m and 10 m (e.g. 5 m radius). Hence, the local variation can be stored in the storage circuitry 30 and obtained by the weight determination circuitry 24 for further processing. In another embodiment said weight determination circuitry 24 can be configured to determine (e.g. on the fly) said local variation in the local sensor area of the magnetic magnitude in the magnetic magnitude map and/or of the further magnetic parameter in the further parameter map from the magnetic magnitude map and/or the further parameter map.

In an embodiment said weight determination circuitry 24 is further configured to determine said weight information such that the weight of the second estimate is increased the fewer variations of the magnetic magnitude, the less motion and/or the fewer steps are shown in a local sensor area, i.e. in this case the estimate from the further parameter is considered to be more reliable.

In another embodiment said weight determination circuitry 24 is further configured to determine said weight information such that the weight of the first estimate is decreased the less variation the magnetic magnitude shows in the local sensor area and/or that the weight of the second estimate is increased the more variation the further magnetic parameter shows in the local sensor area. Thus, if the magnetic field magnitude is almost constant in the surrounding of the estimated (or true) position, whereas the further parameter (e.g. inclination) features larger variations in the same area, the same or more weight might be applied to the further parameter even then it is less reliable compared to the magnetic magnitude.

In another embodiment said comparison circuitry 23 is further configured to use as initial sensor position for determining the region around the magnetic sensor an estimate determined based on the last known position of the magnetic sensor (e.g. from the latest GPS signal, for instance before the user entered a building) and to reduce the size of the region around the magnetic sensor in subsequent comparison steps in order to reduce the volume and time of computations needed for position determination.

In another embodiment said data input 21 is further configured to receive motion information indicating motion of the magnetic sensor and said data processor 22 is further configured to determine the magnetic inclination of the at least one obtained magnetic field vector as further magnetic parameter and to correct the determined magnetic inclination for rotation of the magnetic sensor based on the obtained motion information. This further improves the accuracy and reliability of the position determination.

In still another embodiment there may be a kind of rescue or reset procedure, e.g. if the position cannot be determined by the proposed method, for instance because the user suddenly changed direction and/or moves very fast to get out of the detection range, any new installation is present in the premise that is not yet accounted for in the respective maps or that prevents a secure position determination, etc. Such a procedure may e.g. be started if the likelihood of the determined position is rather low compared to earlier likelihoods of determined positions. In this case, the local sensor area may be increased or the position determination may be restarted completely.

Generally, the disclosed devices and method dynamically integrates the advantages of two fingerprint systems depending on the reliability and amount of local variation of the information available. The more reliable a fingerprint component is and the more local variation it has, the higher it is generally weighted.

Figure 4:
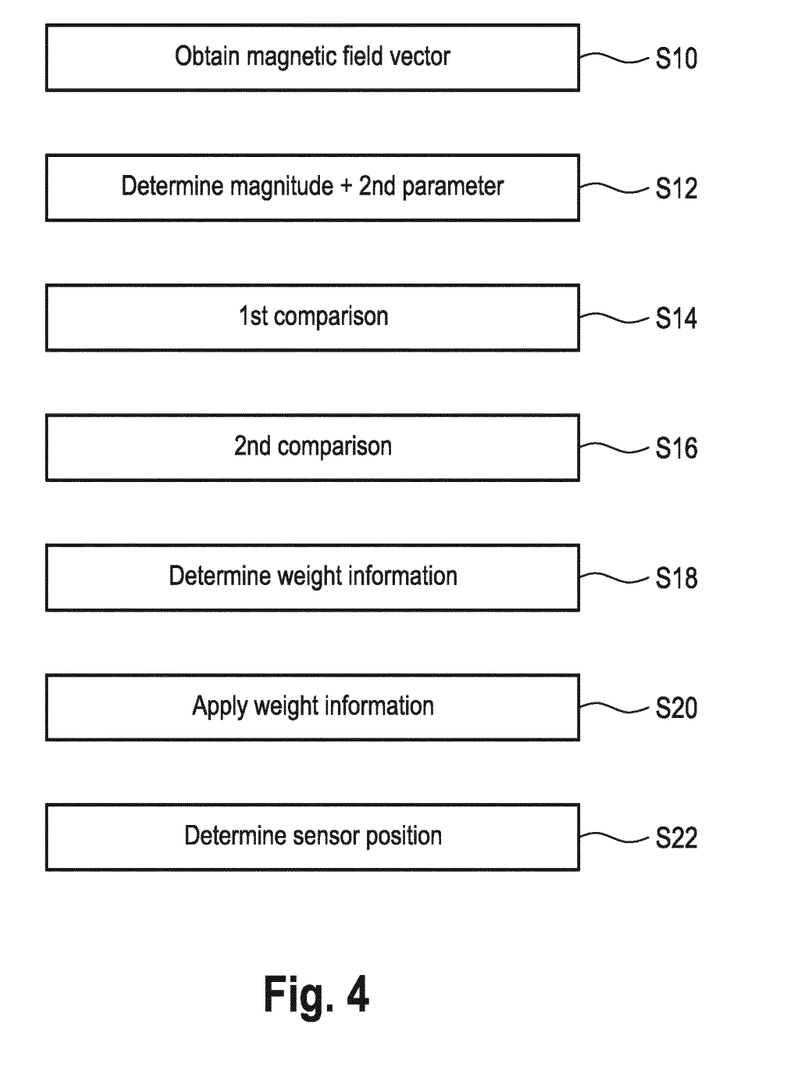
FIG. 4 shows a flow chart of an embodiment of a position determination method according to the present disclosure.

A flow chart of an embodiment of the proposed position determination method is depicted in FIG. 4. Various steps of a practical implementation of said method will be explained in more detail by reference to various diagrams shown in FIG. 5.

A first step S10 comprises obtaining at least one magnetic field vector sensed by a magnetic sensor. A second step S12 comprises determining the magnetic magnitude (e.g. indicated as $m_1$) and a further magnetic parameter (e.g. indicated as $m_2$) of the at least one obtained magnetic field vector (e.g. indicated as $$\vec{m} = \begin{pmatrix} m_1 \\ m_2 \end{pmatrix}).$$

Figure 5A:
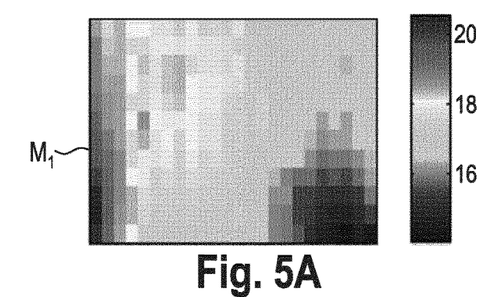
FIG. 5 shows a various diagrams illustrating various steps of an embodiment of the position determination method according to the present disclosure.

A third step S14 comprises comparing the determined magnetic magnitude $m_1$ with a predetermined magnetic magnitude map $M_1$ (as illustrated in FIG. 5A, showing the magnetic strength in µT in a local sensor area) of a region around the magnetic sensor to obtain a first estimate of the sensor position. The first estimate may thus be a first deviation distribution $D_1$ (also called first deviation map; as illustrated in FIG. 5C, showing the deviation error in absolute numbers in the local sensor area), the first deviation distribution $D_1$ indicating the deviation of the determined magnetic magnitude $m_1$ from the magnitude map $M_1$.

Figure 5B:
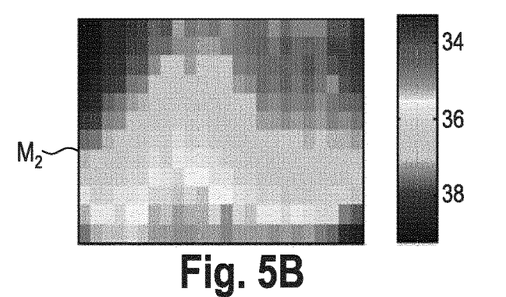
Figure 5C:
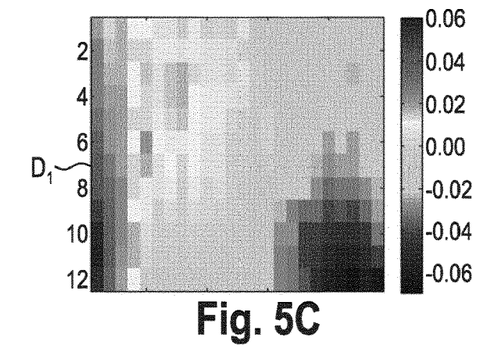
Figure 5D:
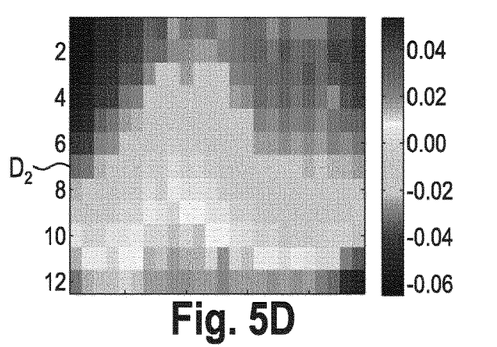

A fourth step S16 comprises comparing the determined further magnetic parameter $m_2$ with a corresponding predetermined further parameter map $M_2$ (as illustrated in FIG. 5B) of a region around the magnetic sensor to obtain a second estimate of the sensor position. The second estimate may thus be a second deviation distribution $D_2$ (also called second deviation map) as illustrated in FIG. 5D, the second deviation distribution $D_2$ indicating the deviation of the determined further magnetic parameter $m_2$ from the further parameter map $M_2$.

A fifth step S18 comprises determining weight information indicating the reliability of the first and/or second estimate of the sensor position and/or the relative weight of the first estimate with respect to the second estimate. The weights may e.g. be expressed as parameters $\sigma_1$ and $\sigma_2$.

Figure 5E:
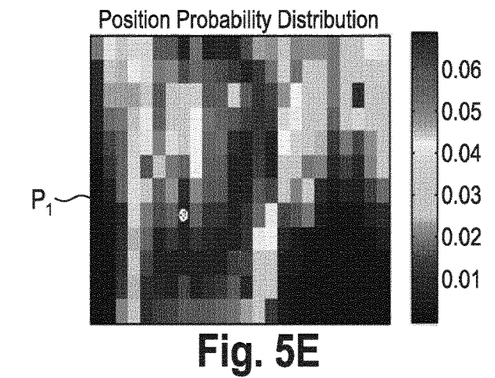
Figure 5F:
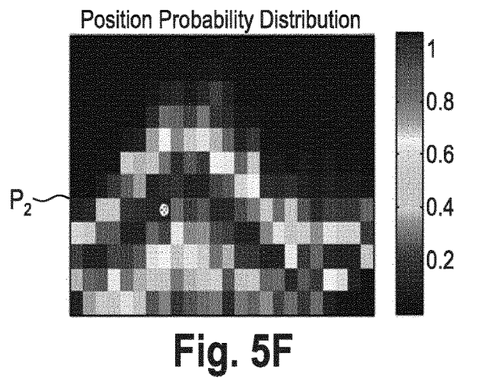

A sixth step S20 comprises weighting the first and second estimates of the sensor position according to the determined weight information. Weighting may be performed by separately (for each estimate) applying a maximum likelihood estimation of the form $$P(m/(x, y)) = \frac{1}{2\pi\sigma^2} e^{-\frac{1}{2\sigma^2}[(m-M(x,y))^2]}$$

wherein $m=m_1$ or $m_2$, $M=M_1$ or $M_2$ and $\sigma=\sigma_1$ or $\sigma_2$, respectively, resulting in two likelihood distributions (also called position probability distribution maps) $P_1$ and $P_2$, as illustrated in FIGS. 5E and 5F (showing the likelihood of the various positions in the local sensor area).

Figure 5G:
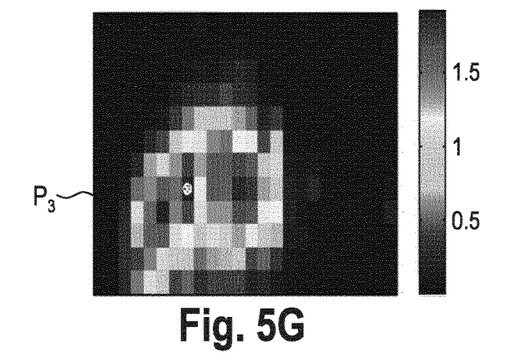

A seventh step S22 comprises determining the sensor position from the weighted first and second estimates. This may be performed by a point-by-point multiplication of the likelihood distributions $P_1$ and $P_2$, resulting in a final likelihood distribution $P_3$ as shown in FIG. 5G. Such a multiplication is particularly applied in case the probabilities of both components $m_1$ and $m_2$ are statistically independent. The weighting may be realized by using different weighting factors $\sigma_1$ and $\sigma_2$ for both components (standard deviation of both Gaussian distribution functions).

In summary, it can be regarded as an object of the present disclosure to provide a position determination device and a corresponding position determination method for determining the position of the device, in particular indoors, with higher reliability and accuracy. It is a further object to provide a corresponding mobile device as well as a non-transitory computer-readable recording medium for implementing said position determination method.

According to an aspect there is provided a position determination device comprising:
- a data input circuitry configured to obtain at least one magnetic field vector sensed by a magnetic sensor,
- a data processor circuitry configured to determine the magnetic magnitude and a further magnetic parameter of the at least one obtained magnetic field vector,
- a comparison circuitry configured to compare the determined magnetic magnitude with a predetermined magnetic magnitude map of a region around the magnetic sensor to obtain a first estimate of the sensor position and to compare the determined further magnetic parameter with a corresponding predetermined further parameter map of a region around the magnetic sensor to obtain a second estimate of the sensor position,
- a weight determination circuitry configured to determine weight information indicating the reliability of the first and/or second estimate of the sensor position and/or the relative weight of the first estimate with respect to the second estimate, and
- a position determination circuitry configured to weight the first and second estimates of the sensor position according to the determined weight information and to determine the sensor position from the weighted first and second estimates.

According to a further aspect there is provided a position determination method comprising:
- obtaining at least one magnetic field vector sensed by a magnetic sensor,
- determining the magnetic magnitude and a further magnetic parameter of the at least one obtained magnetic field vector,
- comparing the determined magnetic magnitude with a predetermined magnetic magnitude map of a region around the magnetic sensor to obtain a first estimate of the sensor position,
- comparing the determined further magnetic parameter with a corresponding predetermined further parameter map of a region around the magnetic sensor to obtain a second estimate of the sensor position,
- determining weight information indicating the reliability of the first and/or second estimate of the sensor position and/or the relative weight of the first estimate with respect to the second estimate,
- weighting the first and second estimates of the sensor position according to the determined weight information, and
- determining the sensor position from the weighted first and second estimates.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed method, the disclosed computer program and the disclosed computer-readable recording medium have similar and/or identical preferred embodiments as the claimed device and as defined in the dependent claims.

One of the aspects of the disclosure is to use a magnetic magnitude and a second magnetic parameter (and, optionally, one or more further magnetic parameters) of the magnetic vector sensed by the magnetic sensor, as currently available in various mobile devices, such as smartphones, instead of vertical and horizontal components of the magnetic vector. From the used parameters the position of the magnetic sensor (i.e. of the mobile device including the magnetic sensor) is estimated, which estimates are then weighted dynamically based on dynamically obtained weight information when fusing them to finally determine the position of the magnetic sensor. This increases the reliability and accuracy of the determined position.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits or circuitry (sometimes also referred to as unit or assembly). A circuit or circuitry is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A position determination device comprising:
   - a data input circuitry configured to obtain at least one magnetic field vector sensed by a magnetic sensor,
   - a data processor circuitry configured to determine the magnetic magnitude and a further magnetic parameter of the at least one obtained magnetic field vector,
   - a comparison circuitry configured to compare the determined magnetic magnitude with a predetermined magnetic magnitude map of a region around the magnetic sensor to obtain a first estimate of the sensor position and to compare the determined further magnetic parameter with a corresponding predetermined further parameter map of a region around the magnetic sensor to obtain a second estimate of the sensor position, a weight determination circuitry configured to determine weight information indicating the reliability of the first and/or second estimate of the sensor position and/or the relative weight of the first estimate with respect to the second estimate, and a position determination circuitry configured to weight the first and second estimates of the sensor position according to the determined weight information and to determine the sensor position from the weighted first and second estimates.

2. The position determination device as defined in embodiment 1,
wherein said data processor circuitry is further configured to determine the magnetic inclination, the vertical magnetic component or the horizontal magnetic component of the at least one obtained magnetic field vector as further magnetic parameter.

3. The position determination device as defined in embodiment 1 or 2,
wherein said weight determination circuitry is further configured to determine said weight information based on the variation of the further magnetic parameter, direction of gravity, motion and/or step pattern.

4. The position determination device as claimed in embodiment 3,
wherein said weight determination circuitry is further configured to determine said weight information such that the weight of the second estimate is increased the fewer variations of the magnetic magnitude, the less motion and/or the fewer steps are shown in a local sensor area.

5. The position determination device as defined in any preceding embodiment,
wherein said weight determination circuitry is further configured to determine said weight information based on the local variation in a local sensor area of the magnetic magnitude in the magnetic magnitude map and/or of the further magnetic parameter in the further parameter map.

6. The position determination device as claimed in embodiment 5,
wherein said weight determination circuitry is further configured to determine said weight information such that the weight of the first estimate is decreased the less variation the magnetic magnitude shows in the local sensor area and/or that the weight of the second estimate is increased the more variation the further magnetic parameter shows in the local sensor area.

7. The position determination device as claimed in embodiment 5,
wherein said weight determination circuitry is further configured to determine said local variation in the local sensor area of the magnetic magnitude in the magnetic magnitude map and/or of the further magnetic parameter in the further parameter map from the magnetic magnitude map and/or the further parameter map 8. The position determination device as claimed in embodiment 5,
wherein said weight determination circuitry is further configured to obtain said local variation as predetermined input.

9. The position determination device as defined in any preceding embodiment,
wherein said data input circuitry is further configured to obtain a horizontal magnetic component map and a vertical magnetic component map of the region around the magnetic sensor and said data processor is further configured to determine said magnetic magnitude map and/or said further parameter map of the region around the magnetic sensor from the obtained horizontal magnetic component map and vertical magnetic component map.

10. The position determination device as defined in embodiment 1,
wherein said data input circuitry is further configured to obtain said magnetic magnitude map and/or said further parameter map as predetermined input.

11. The position determination device as defined in any preceding embodiment,
wherein said weight determination circuitry is further configured to use as local sensor area an area having a radius in a range between 1 m and 20 m, in particular in a range between 2 m and 10 m.

12. The position determination device as defined in any preceding embodiment,
further comprising a filter configured to low-pass filter said obtain at least one magnetic field vector, wherein said data processor configured to determine the magnetic magnitude and the further magnetic parameter from the at least one filtered magnetic field vector.

13. The position determination device as defined in any preceding embodiment,
wherein said comparison circuitry is further configured to use as initial sensor position for determining the region around the magnetic sensor an estimate determined based on the last known position of the magnetic sensor and to reduce the size of the region around the magnetic sensor in subsequent comparison steps.

14. The position determination device as defined in any preceding embodiment,
wherein said data input circuitry is further configured to receive motion information and/or orientation information indicating motion and/or orientation of the magnetic sensor and wherein said data processor is further configured to determine the magnetic inclination of the at least one obtained magnetic field vector as further magnetic parameter and to correct the determined magnetic inclination for rotation of the magnetic sensor based on the obtained motion information.

15. The position determination device as defined in any preceding embodiment,
wherein said position determination circuitry is configured to determine a first position likelihood distribution from the first estimate and the weighting information, to determine a second position likelihood distribution from the second estimate and the weighting information, and to determine the sensor position by combining the first and second position likelihood distributions, in particular by point-by-point multiplication.

16. The position determination device as defined in embodiment 15,
wherein said comparison circuitry is configured to obtain a first deviation distribution as first estimate, the first deviation distribution indicating the deviation of the determined magnetic magnitude from the magnitude map, and a second deviation distribution as second estimate, the second deviation distribution indicating the deviation of the determined further magnetic parameter from the further parameter map.

17. A position determination method comprising:
obtaining at least one magnetic field vector sensed by a magnetic sensor,
determining the magnetic magnitude and a further magnetic parameter of the at least one obtained magnetic field vector, comparing the determined magnetic magnitude with a predetermined magnetic magnitude map of a region around the magnetic sensor to obtain a first estimate of the sensor position, comparing the determined further magnetic parameter with a corresponding predetermined further parameter map of a region around the magnetic sensor to obtain a second estimate of the sensor position, determining weight information indicating the reliability of the first and/or second estimate of the sensor position and/or the relative weight of the first estimate with respect to the second estimate, weighting the first and second estimates of the sensor position according to the determined weight information, and determining the sensor position from the weighted first and second estimates.

18. A mobile device comprising:
a magnetic sensor for sensing at least one magnetic field vector at the position of the mobile device,
a position determination device as defined in embodiment 1 for determining the position of the mobile device based on the at least one magnetic field vector sensed by the magnetic sensor.

19. The mobile device as defined in embodiment 18, further comprising a motion detector for obtaining motion information indicating motion of the mobile device,
wherein said a position determination device is configured as claimed in embodiment 3 or 16.

20. The mobile device as defined in embodiment 18 or 19, wherein said mobile device is one of a handheld device, wearable device, mobile phone, smartphone, portable phone, camera, watch, vital signs monitor, laptop, tablet, or glasses.

21. A non-transitory computer-readable recording medium that stores therein a computer program product, which, when executed by a processor, causes the method according to claim 17 to be performed.

22. A computer program comprising program code means for causing a computer to perform the steps of said method according to embodiment 17 when said computer program is carried out on a computer.

The invention claimed is:

1. A position determination device, comprising:
a data input circuitry configured to obtain at least one magnetic field vector sensed by a magnetic sensor,
a data processor circuitry configured to determine the magnetic magnitude and a further magnetic parameter of the at least one obtained magnetic field vector,
a comparison circuitry configured to compare the determined magnetic magnitude with a predetermined magnetic magnitude map of a region around the magnetic sensor to obtain a first estimate of the sensor position and to compare the determined further magnetic parameter with a corresponding predetermined further parameter map of a region around the magnetic sensor to obtain a second estimate of the sensor position,
a weight determination circuitry configured to determine weight information indicating the reliability of the first and/or second estimate of the sensor position and/or the relative weight of the first estimate with respect to the second estimate, wherein the weight information is determined based on a local variation of one or more of the magnetic magnitude in the magnetic magnitude map in a local sensor area, wherein the weight of the first estimate is decreased corresponding to less variation in the magnetic magnitude in the local sensor area, and the further magnetic parameter in the further parameter map in the local sensor area, and
a position determination circuitry configured to weight the first and second estimates of the sensor position according to the determined weight information and to determine the sensor position from the weighted first and second estimates,
wherein a radius range of the local sensor area is adjusted dynamically based on the local variation of one or more of the magnetic magnitude map and the further magnetic parameter map, wherein the radius range is increased corresponding to more variation in the local sensor area.

2. The position determination device as claimed in claim 1,
wherein said data processor circuitry is further configured to determine the magnetic inclination, the vertical magnetic component or the horizontal magnetic component of the at least one obtained magnetic field vector as further magnetic parameter.

3. The position determination device as claimed in claim 1,
wherein said weight determination circuitry is further configured to determine said weight information based on the variation of the further magnetic parameter, direction of gravity, motion and/or step pattern.

4. The position determination device as claimed in claim 3,
wherein said weight determination circuitry is further configured to determine said weight information such that as the weight of the second estimate is increased the fewer variations of the magnetic magnitude, the less motion, and/or the fewer steps are present in a local sensor area.

5. The position determination device as claimed in claim 1,
wherein said weight determination circuitry is further configured to determine said weight information such that the weight of the second estimate is increased corresponding to more variation in the further magnetic parameter in the local sensor area.

6. The position determination device as claimed in claim 1,
wherein said weight determination circuitry is further configured to determine said local variation in the local sensor area of the magnetic magnitude in the magnetic magnitude map and/or of the further magnetic parameter in the further parameter map from the magnetic magnitude map and/or the further parameter map.

7. The position determination device as claimed in claim 1,
wherein said weight determination circuitry is further configured to obtain said local variation as predetermined input.

8. The position determination device as claimed in claim 1,
wherein said data input circuitry is further configured to obtain a horizontal magnetic component map and a vertical magnetic component map of the region around the magnetic sensor and said data processor circuitry is further configured to determine said magnetic magnitude map and/or said further parameter map of the region around the magnetic sensor from the obtained horizontal magnetic component map and vertical magnetic component map.

9. The position determination device as claimed in claim 1,
wherein said data input circuitry is further configured to obtain said magnetic magnitude map and/or said further parameter map as predetermined input.

10. The position determination device as claimed in claim 1,
wherein said weight determination circuitry is further configured to use as local sensor area an area having a radius in a range between 1 m and 20 m.

11. The position determination device as claimed in claim 1,
wherein said position determination circuitry is configured to determine a first position likelihood distribution from the first estimate and the weighting information, to determine a second position likelihood distribution from the second estimate and the weighting information, and to determine the sensor position by combining the first and second position likelihood distributions.

12. The position determination device as claimed in claim 1,
wherein said comparison circuitry is configured to obtain a first deviation distribution as first estimate, the first deviation distribution indicating the deviation of the determined magnetic magnitude from the magnitude map, and a second deviation distribution as second estimate, the second deviation distribution indicating the deviation of the determined further magnetic parameter from the further parameter map.

13. The position determination device as claimed in claim 1,
wherein said comparison circuitry is further configured to use as initial sensor position for determining the region around the magnetic sensor an estimate determined based on the last known position of the magnetic sensor and to reduce the size of the region around the magnetic sensor in subsequent comparison steps.

14. The position determination device as claimed in claim 1,
wherein said data input circuitry is further configured to receive motion information and/or orientation information indicating motion and/or orientation of the magnetic sensor and wherein said data processor circuitry is further configured to determine the magnetic inclination of the at least one obtained magnetic field vector as further magnetic parameter and to correct the determined magnetic inclination for rotation of the magnetic sensor based on the obtained motion information.

15. A position determination method comprising:
obtaining at least one magnetic field vector sensed by a magnetic sensor;
determining the magnetic magnitude and a further magnetic parameter of the at least one obtained magnetic field vector;
comparing the determined magnetic magnitude with a predetermined magnetic magnitude map of a region around the magnetic sensor to obtain a first estimate of the sensor position;
comparing the determined further magnetic parameter with a corresponding predetermined further parameter map of a region around the magnetic sensor to obtain a second estimate of the sensor position;
determining weight information indicating the reliability of the first and/or second estimate of the sensor position and/or the relative weight of the first estimate with respect to the second estimate, wherein the weight information is determined based on a local variation of one or more of the magnetic magnitude in the magnetic magnitude map in a local sensor area, wherein the weight of the first estimate is decreased corresponding to less variation in the magnetic magnitude in the local sensor area, and the further magnetic parameter in the further parameter map in the local sensor area;
weighting the first and second estimates of the sensor position according to the determined weight information; and
determining the sensor position from the weighted first and second estimates,
wherein a radius range of the local sensor area is adjusted dynamically based on the local variation of one or more of the magnetic magnitude map and the further magnetic parameter map, wherein the radius range is increased corresponding to more variation in the local sensor area.

16. A mobile device comprising:
a magnetic sensor for sensing at least one magnetic field vector at the position of the mobile device;
a position determination device as claimed in claim 1 for determining the position of the mobile device based on the at least one magnetic field vector sensed by the magnetic sensor.

17. The mobile device as claimed claim 16,
further comprising a motion detector for obtaining motion information indicating motion of the mobile device.

18. The mobile device as claimed claim 16,
wherein said mobile device is one of a handheld device, wearable device, mobile phone, smartphone, portable phone, camera, watch, vital signs monitor, laptop, tablet, or glasses.

19. A non-transitory computer-readable recording medium that stores therein a computer program product, which, when executed by a processor, causes the processor to perform a method, the method comprising:
obtaining at least one magnetic field vector sensed by a magnetic sensor;
determining the magnetic magnitude and a further magnetic parameter of the at least one obtained magnetic field vector;
comparing the determined magnetic magnitude with a predetermined magnetic magnitude map of a region around the magnetic sensor to obtain a first estimate of the sensor position;
comparing the determined further magnetic parameter with a corresponding predetermined further parameter map of a region around the magnetic sensor to obtain a second estimate of the sensor position;
determining weight information indicating the reliability of the first and/or second estimate of the sensor position and/or the relative weight of the first estimate with respect to the second estimate, wherein the weight information is determined based on a local variation of one or more of the magnetic magnitude in the magnetic magnitude map in a local sensor area, wherein the weight of the first estimate is decreased corresponding to less variation in the magnetic magnitude in the local sensor area, and the further magnetic parameter in the further parameter map in the local sensor area;
weighting the first and second estimates of the sensor position according to the determined weight information; and
determining the sensor position from the weighted first and second estimates,
wherein a radius range of the local sensor area is adjusted dynamically based on the local variation of one or more of the magnetic magnitude map and the further magnetic parameter map, wherein the radius range is increased corresponding to more variation in the local sensor area.

* * * * *